United States Patent [19]

Oishi et al.

[11] Patent Number: 5,158,810
[45] Date of Patent: Oct. 27, 1992

[54] MELT-MOLDED ARTICLES AND LAMINATES DERIVED THEREFROM, AND THEIR USE

[75] Inventors: Tsukasa Oishi, Mokou; Masaru Saeki, Osaka; Munetoshi Tomita, Minoo, all of Japan

[73] Assignee: Nippon Gohsei Kagaku Kogyo Kabushiki Kaisha, Osaka, Japan

[21] Appl. No.: 754,827

[22] Filed: Sep. 4, 1991

[30] Foreign Application Priority Data

May 12, 1990 [JP] Japan .................. 2-406275
Sep. 4, 1990 [JP] Japan .................. 2-235175
Oct. 15, 1990 [JP] Japan .................. 2-276804
Nov. 14, 1990 [JP] Japan .................. 2-309998

[51] Int. Cl.$^5$ .................. A61F 5/44; B65D 30/08
[52] U.S. Cl. .................. 428/35.4; 428/34.1; 428/34.3; 428/36.1; 428/113; 428/359; 428/364; 428/373; 428/413; 428/500; 428/515; 428/532; 428/286; 525/60; 524/52; 604/317; 604/327; 604/332; 604/403; 604/408
[58] Field of Search .................. 524/52; 604/317, 327, 604/332, 403, 408; 525/60, 34.1; 428/34.3, 35.4, 36.1, 113, 359, 364, 373, 413, 500, 515, 532, 286

[56] References Cited

U.S. PATENT DOCUMENTS

| 3,488,724 | 1/1970 | Donermeyer et al. | 524/52 X |
| 3,949,145 | 4/1976 | Otey et al. | 524/52 X |
| 3,952,347 | 4/1976 | Comerford et al. | 524/52 X |
| 3,992,496 | 11/1976 | Matsunaga et al. | 524/52 X |
| 4,172,054 | 10/1979 | Ogawa et al. | 524/52 X |
| 4,824,904 | 4/1989 | Aoyama et al. | 525/60 |
| 4,835,198 | 5/1989 | Kohno et al. | 524/52 X |
| 4,900,361 | 2/1990 | Sachetto et al. | 524/52 X |
| 4,933,383 | 6/1990 | Murdock et al. | 524/52 |
| 4,946,720 | 8/1990 | Oishi et al. | 428/35.4 |

FOREIGN PATENT DOCUMENTS

| 0202363 | 12/1982 | Japan | 524/52 |
| 1044935 | 3/1986 | Japan | 524/52 |
| 0718513 | 2/1980 | U.S.S.R. | 524/52 |

*Primary Examiner*—Joseph L. Schofer
*Assistant Examiner*—J. M. Reddick
*Attorney, Agent, or Firm*—Armstrong, Nikaido, Marmelstein, Kubovcik & Murray

[57] ABSTRACT

A melt-molded article such as water soluble fibers, a laminate and a container for waste matter, the article having biodegradability. The melt molded article is produced by melt-molding a composition comprising an oxyalkylene group-containing vinyl alcohol copolymer and starch or a starch-derived macromolecular substance.

8 Claims, No Drawings

MELT-MOLDED ARTICLES AND LAMINATES DERIVED THEREFROM, AND THEIR USE

BACKGROUND OF THE INVENTION

The present invention relates to a method of producing shaped articles having biodegradability by melt molding, in particular to a method of producing said shaped articles by melt molding under substantially plasticizer-free and substantially anhydrous conditions.

The invention also relates to water-soluble fibers which are useful in the production of chemical laces or nonwoven fabrics, or as water-soluble hot-melt adhesives.

The invention further relates to laminates comprising an oxyalkylene group-containing vinyl alcohol copolymer film layer and a thermoplastic resin layer an showing good degradability and interlaminar bonding.

The invention still further relates to containers for filthy waste matter, in particular bags or pouches for collecting excreta from the artificial anus, which have good water resistance, odor-retaining property, flexibility and non-sound-producing property as well as favorable feel and touch and which can be thrown into the flush toilet bowl and, after such throwing, can be degraded so that the environmental pollution can be minimized.

Biodegradable Shaped Articles

Waste plastic moldings, such as plastic films used as materials for agricultural purposes, tapes and bands for binding or packaging purposes and plastic films thrown away by routes other than regular ones, can long retain their shape or form and are producing serious environmental pollution problems. It is therefore desirable that such molded articles to be possibly thrown away outdoors or in rivers, for instance, should be degraded by microorganisms in the soil or water after achievement of their intended purposes.

Under these circumstances, intensive studies have recently been made to develop biodegradable moldings.

It is known that incorporation of starch or a starch-derived macromolecule is effective in rendering plastic moldings biodegradable.

Japanese Kokai Tokkyo Koho No. 2-14228, for instance, discloses a compounded polymer material obtained from a melt containing water-containing degraded starch and at least one substantially water-insoluble synthetic thermoplastic polymer. In this case, the specification mentions that water-soluble polysaccharides, cellulosic polymers, water-soluble synthetic polymers and the like may be used as further additives.

U.S. Pat. No. 3,949,145 discloses a degradable multilayer film for agricultural use which comprises a film consisting of 1 to 4 parts by weight of polyvinyl alcohol having a saponification degree of 85 to 100 mole percent, 8 parts by weight of starch and 1 to 5 parts of glycerol and a water-resistant coating layer made of a mixture of 0.1 to 0.2 part by weight of a free isocyanate group-containing polyol-toluenediisocyanate prepolymer and 1 part by weight of a vinylidene chloride-acrylonitrile copolymer or plasticized polyvinyl chloride.

The present applicants have filed an application for patent concerning a polyvinyl alcohol-starch film comprising polyvinyl alcohol having a saponification degree of at least 93 mole percent and starch species and stretched at least uniaxially (Japanese Patent Application No. 63-307225).

Film production from thermoplastic resins for general use, such as polyolefins, with starch or a starch-derived macromolecule incorporated therein has already put into practice. However, it is only the starch or starch-derived macromolecule in molding that shows biodegradability. Therefore, while the moldings may lose their film-like or other shape, the thermoplastic resin portions, such as polyolefin portions, will remain undegraded for a long period of time.

Meanwhile, it can be expected that films or other articles molded from a composition comprising a water-soluble resin, such as polyvinyl alcohol, and starch or a starch-derived macromolecule would meet strength requirements and allow not only the starch or starch-derived macromolecule but also the water-soluble resin (e.g. polyvinyl alcohol) portions to be biodegraded.

However, polyvinyl alcohol intrinsically has a thermal decomposition point close to its fusion temperature, hence can hardly be molded by melt molding under anhydrous conditions. For smooth molding, it is necessary to subject an aqueous solution to film casting or add a considerable quantity of water or a plasticizer (e.g. glycerol) and carry out molding in a fused and dissolved state. Molding a composition comprising polyvinyl alcohol and starch or a starch-derived macromolecule has similar limitations.

Film casting using an aqueous solution of polyvinyl alcohol (or a composition comprising the same and starch or a starch-derived macromolecule) has drawbacks: for instance, a step is required for preparing said aqueous solution, the rate of film formation is slow, and long time is required for drying after film formation. The technique of molding which comprises adding a considerable amount of water and carrying out molding in a fused and dissolved state is also disadvantageous in that a long drying time is required after molding. In addition, the moldings thus obtained will lose their flexibility under low humidity conditions. This restricts their applications severely. The use of a plasticizer for securing flexibility produces a new problem, namely the bleeding problem due to the plasticizer incorporated.

The technique which comprises incorporating a considerable amount of a plasticizer into polyvinyl alcohol (or a composition comprising the same and starch or a starch-derived macromolecule) and carrying out molding in a fused and dissolved state may be satisfactory from the film formation rate viewpoint but encounters problems from the quality viewpoint, namely bleeding due to the plasticizer incorporated or sticking together of moldings.

Accordingly, it is an object of the invention to provide a method of producing biodegradable shaped articles by which the problems mentioned above can be solved.

Water-Soluble Fibers

Water-soluble polyvinyl alcohol resins are used widely in textile processing or treatment, especially in the so-called special processing, such as hard finishing of cloths, pigment printing, flock working, pasting cloths together, or nonwoven fabric manufacture. Their characteristics are well displayed particularly when used in special fields where their water solubility should be utilized, for example when used as fibers for chemical lace manufacture, as binders of nonwoven fabrics, or as water-soluble fibrous binders.

In such applications, polyvinyl alcohol is eventually dissolved and removed by washing with water. In this case, that the polyvinyl alcohol to be used has a high water solubility is advantageous from the industrial viewpoint since a higher water solubility leads to a higher removal efficiency, hence to a reduction in the time required for the washing step.

However, water-soluble fibers produced from the conventional polyvinyl alcohol species, though they have a considerable degree of water solubility, cannot always satisfy the recent increasing demand for more speedy processing.

Furthermore, in the production of water-soluble fibers themselves, it is necessary to prepare an aqueous solution of polyvinyl alcohol by blending with water and a plasticizer and subjecting the solution to dry spinning through a nozzle. Thus a long time and a number of complicated steps are required for the preparation of said aqueous solution of polyvinyl alcohol treatment of the solution, such as defoaming, and for drying following spinning, so that the productivity can hardly be said to be satisfactory for the practice on a commercial scale. On the contrary, the melt spinning method seems advantageous since it does not require the preparation of an aqueous solution of polyvinyl alcohol but only requires heating polyvinyl alcohol for melting, if necessary after admixing with a plasticizer. However, the fusion temperature of polyvinyl alcohol is intrinsically close to the thermal decomposition point, so that products obtained by melt spinning tend to have been degraded or colored. The use of a plasticizer in larger amounts in an attempt to avoid such problem will produce other problems such as mutual adhesion of the fibers obtained to make their handling troublesome. Fibers which can be produced by melt spinning without concomitant use of a plasticizer in large quantities and are higher in water solubility, if developed, would be very advantageous from an industrial or commercial viewpoint.

The present inventors have previously proposed fibers produced from oxyalkylene group-containing vinyl alcohol copolymers as a result of intensive investigations to solve the problems mentioned above. The use of oxyalkylene group-containing vinyl alcohol copolymers indeed makes it possible to carry out melt spinning without the combined use of a plasticizer in large amounts but does not result in a marked increase in the water solubility of the fibers. Development of further fiber species is needed.

As a result of intensive investigations, the present inventors found that water-soluble fibers produced from a composition comprising an oxyalkylene group-containing vinyl alcohol copolymer and starch or a starch-derived macromolecule can meet the demand of the art and, based on this finding, have now completed the present invention. Thus it is an object of the invention to provide such water-soluble fibers.

Laminates

Oxyalkylene group-containing vinyl alcohol copolymers show improved flexibility and mechanical strength while retaining characteristics of vinyl alcohol polymers, for example, oxygen barrier property, odor retaining property and oil resistance, and therefore they are expected to be useful in the field of packaging materials and in other applications.

Certain laminated films comprising an oxyalkylene group-containing vinyl alcohol copolymer film layer and a thermoplastic resin layer are known.

For instance, Japanese Kokai Tokkyo Koho No. 160550/89 (the applicants being the same as in the present application) discloses containers for filthy waste matter (ostomy bags, etc.) made of a laminated packaging material comprising an oxyalkylene group-containing vinyl alcohol copolymer film layer. Japanese Kokai Tokkyo Koho No. 158016/89 (the applicants being the same as in the present invention) discloses water-resistant flexible films made of an oxyalkylene group-containing vinyl alcohol copolymer and showing a specific water dissolution temperature and a specific value of Young's modulus and also refers to lamination of this film to another substrate.

Japanese Kokai Tokkyo Koho No. 231749/87 discloses laminates having a good gas barrier property which comprise at least a layer of an ethylene-vinyl alcohol copolymer modified by a polyether component added terminally to the ethylene-vinyl alcohol copolymer and a layer of another thermoplastic resin. Japanese Kokai Tokkyo Koho No. 231750/87 also discloses laminates having a good gas barrier property which comprise at least a layer of an ethylene-vinyl alcohol copolymer modified by grafting a polyether component as a branch polymer and a layer of another thermoplastic resin.

As mentioned above, several laminated films having an oxyalkylene group-containing vinyl alcohol copolymer film layer/thermoplastic resin layer structure are known. For any of the laminates described in the patent publications cited above, no consideration has been given to their degradability. To met the recent market requirement, a solution must be found in this respect.

In the laminated films mentioned above, both the layers generally differ in polarity in a manner as if quite opposite and, therefore, the adhesion between both the layers tends to be insufficient not only when both the layers are directly in contact but also when an adhesive layer lies between both the layers. As a result, the laminated films may, in some instances, fail to show the desired mechanical strength and/or oxygen barrier property.

Accordingly, it is an object of the present invention to provide laminates which have an oxyalkylene group-containing vinyl alcohol copolymer film layer/thermoplastic resin layer construction and with which degradability and interlaminar adhesion problems can be solved simultaneously.

Containers for Filthy Waste Matter

Immediately after operative treatment of diseases of tubular or cavitary organs, such as the ileum, transverse colon, descending colon, sigmoid colon and anal fistula, a minute opening (stoma), generally called an artificial anus, is sometimes formed on the body surface for discharge of filthy waste matter, such as fecal matter, pus or body fluid, therethrough. Not only immediately after operations but also during convalescence and even after return to work, the artificial anus is retained in many instances.

Bags for collecting the waste matter excreted from the artificial anus are called ostomy bags, colostomy bags, ileostomy bags and so forth depending of the tubular or cavitary organ to which the stoma is connected.

As to the construction of bags of this kind, various proposals have so far been made, as mentioned below.

A Japanese patent application filed under PTC and laid open under Kohyo No. 501631/82 discloses bags chiefly intended for medical use which have a structure such that a vapor barrier layer, such as a vinylidene chloride-vinyl chloride copolymer layer, lies between two layers made of a blend of a chlorinated polyolefin and an olefin polymer.

Japanese Kokai Tokkyo Koho No. 1246/85 discloses non-sound-producing films for the manufacture of ostomy bags which comprise either a layer of a blend of an ethylene-vinyl acetate copolymer and an elastic polyolefin or two layers of said blend and a gas/odor barrier layer of a vinylidene chloride copolymer, an ethylene-vinyl alcohol copolymer, a vinylidene fluoridevinyl fluoride copolymer, a polyamide or the like as interposed between said two layers.

Japanese Kokai Tokkyo Koho No. 122527/85 discloses bags for excreta from the human body which are made of a 3-hydroxybutyrate polymer film or a laminate derived therefrom. As films usable for lamination to said film, there are mentioned water-soluble polymer films, such as polyvinyl alcohol films and polyethylene oxide films.

Japanese Kokai Jitsuyo-Shinan Koho No. 175248/85 discloses films for bags to be attached to an artificial anus which are produced by three-layer coextrusion of a blend of a saponified ethylene-vinyl acetate copolymer and a partially saponified ethylenevinyl acetate copolymer (as a middle layer) and an ethylene-(meth)acrylic ester copolymer (as sandwiching layers).

Japanese Kokai Tokkyo Koho No. 31151/86 discloses bags for receiving feces from an artificial anus which comprise a deodorizing coagulant disposed on the bag bottom and in the tubular section, where a readily water-soluble paper species is used.

Bags currently in practical use for collecting filthy waste matter excreted from an artificial anus have a three-layer construction of ethylene vinylacetate copolymer (inside layer)/polyvinylidene chloride/ethylenevinyl acetate copolymer (outside layer) or a four-layer construction derived from said three-layer construction by further lamination of a nonwoven fabric or a net-like structure.

The present applicants have filed an application for patent concerning a container for filthy waste matter which is made of a monolayer or multilayer packaging material having an oxyalkylene group-containing vinyl alcohol copolymer film layer (Japanese Patent Application No. 160550/89).

Bags for collecting filthy matter discharged through the artificial anus are required to have all the functions promoting the users' convenience, for example, water resistance, odor barrier property (ability to prevent odor from leaking out), non-sound-producing property or flexibility, disposability in flush toilet, and acceptability in touch.

In addition to the above-mentioned functions, which mainly serve the convenience of users, degradability after disposal has recently been required as well from the standpoint of environmental pollution control.

The bags disclosed in the above-cited patent publications, namely Japanese Kokai Tokkyo Koho No. 501631/82, No. 1246/85 and No. 122527/85, Japanese Kokai Jitsuyo-Shinan Koho No. 175248/85 and Japanese Kokai Tokkyo Koho No. 31151/86 can indeed satisfy some of the functional requirements mentioned above from the users' convenience viewpoint but are unsatisfactory in some functions. No special consideration has been given to said bags from the viewpoint of degradability after disposal. Even those bags currently in practical use which have an ethylene-vinyl acetate copolymer/polyvinylidene chloride/ethylene-vinyl acetate copolymer three-layer structure or a four-layer structure derived therefrom by further lamination of a nonwoven fabric or a net-like material have similar problems.

No attention has been paid at all even to the bags for filthy waste matter proposed by the present applicants (Japanese Kokai Tokkyo Koho No. 160550/89) claiming that they have the following functional characteristics: water resistance, odor barrier property, flexibility or non-sound-producing property, acceptability in feel and touch, and disposability in a flush toilet.

The number of artificial anus carriers is increasing year by year, with an increase in the number of persons who have returned to work. Under such circumstances, it is strongly demanded that bags which not only meet the functional requirements mentioned above from the users' convenience viewpoint but also have degradability, namely are prevented from causing environmental pollution, should be developed.

Accordingly, it is an object of the invention to provide containers for filthy waste matter which meet the functional requirements from the users' convenience viewpoint and at the same time are degradable after throwing.

SUMMARY OF THE INVENTION

The melt-molded articles of this invention are produced by melt-molding a composition comprising an oxyalkylene group-containing vinyl alcohol copolymer and starch or a starch or a starch-derived macromolecule.

Said melt-molded articles are preferably in the form on fibers of films.

The laminates of this invention comprise at least one film layer produced in the above manner. The other laminating layer is preferably a thermoplastic resin layer. One of preferred applications of said laminates is in producing containers for filthy waste matter.

DETAILED DESCRIPTION OF THE INVENTION

Oxyalkylene Group-Containing Vinyl Alcohol Copolymer

The oxyalkylene group-containing vinyl alcohol copolymer includes products of saponification of copolymers of an oxyalkylene group-containing, ethylenically unsaturated monomer and a vinyl ester. Examples of the oxyalkylene group-containing, ethylenically unsaturated monomer are polyoxyalkylene (meth)-acrylate, polyoxyalkylene (meth)acrylamide, polyoxyalkylene (1-(meth)acrylamido-1,1-dimethylpropyl) ester, polyoxyalkylene (meth)allyl ether, polyoxyalkylene vinyl ether, and the like. The oxyalkylene is, for example, oxyethylene or oxypropylene. The number of moles of the oxyalkylene unit in the polyoxyalkylene moiety is suitably 1 to 300, preferably 1 to 50, more preferably 5 to 50.

The oxyalkylene group-containing vinyl alcohol copolymer can be produced also by reacting polyvinyl alcohol with an alkylene oxide or by polymerizing vinyl acetate on polyalkylene glycol, followed by saponification.

Among the oxyalkylene group-containing vinyl alcohol copolymers mentioned above, the oxyalkylene allyl ether type vinyl alcohol copolymers are particularly preferred, hence are mentioned below in further detail.

Said copolymers comprise a vinyl alcohol unit (A), a vinyl ester unit (B) and an oxyalkylene allyl ether unit (C) of the formulas:

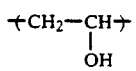 (A)

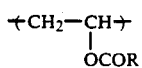 (B)

 (C)

wherein $R^1$ in (B) is an alkyl group; $R^2$ and $R^3$ in (C) each is a hydrogen atom or an alkyl group; $R^4$ in (C) is a hydrogen atom, an alkyl group, a phenyl group or a substituted phenyl group; n is equal to 1 through 300; in proportions of a mol %, b mol % and c mol %, respectively, where $$0.1 \leq c \leq 20 \quad (i)$$

$$50 \leq 100a/(a+b) \leq 100 \quad (ii)$$

and have a melt index of not less than 5 g/10 min. under a load of 2160 g at a temperature of 210° C.

The first expression (i) means that the proportion of oxyalkylene allyl ether unit (C) in the copolymer must be within the range of 0.1 to 20 mol %. The improving effect of the invention will not be sufficient if the proportion of (C) is less than 0.1 mol %, whereas the use of (C) in excess of 20 mol % impairs the inherent properties of polyvinyl alcohol. The preferred range is 0.1 to 10 mol %, and the particularly preferred range is 0.1 to 5 mol %.

The second expression (ii) means that the degree of saponification of the vinyl ester component (B) before hydrolysis must be within the range of 50 to 100 mol %. When the degree of saponification is less than 50 mol %, the hydrophilicity, odor barrier property, oil resistance, antistaticity, oxygen barrier property and warmth retention property of polyvinyl alcohol are not fully obtained. The particularly preferred range is 80 to 100 mol %. The higher the degree of saponification, the more advantageous it is in fully utilizing the properties intrinsic of the vinyl alcohol group.

If required, various optional monomers other than (A), (B) and (C) may be present in a proportion not exceeding about 10 mol % provided that the water solubility is not impaired. Such other monomers include, among others, α-olefins such as ethylene, propylene, long-chain α-olefin, etc. and ethylenically unsaturated carboxylic monomers such as acrylic acid, methacrylic acid, crotonic acid, maleic acid, fumaric acid or itaconic acid, and their half and full alkyl esters, anhydrides, amides, imides and salts, ethylenically unsaturated sulfonic monomers such as ethylenesulfonic acid, allylsulfonic acid or methallylsulfonic acid, and their salts, cationic monomers such as N-acrylamide methyl trimethyl ammonium chloride, allyl trimethyl ammonium chloride, dimethyl diallyl ammonium chloride, diethyl diallyl ammonium chloride, alkyl vinyl ether and so on.

The preferred unit (B) is vinyl acetate. In this case, the effect of the invention is particularly remarkable when the oxyalkylene moiety $CHR^2$—$CHR^3$—O of unit (C) accounts for 3 to 50 weight % of the total resin. Thus, it is important to insure not only that the proportion of (C) in the copolymer is within the range of 0.1 to 20 mol %, preferably 0.1 to 10 mol %, more preferably 0.1 to 5 mol %, but also that the oxyalkylene moiety accounts for 3 to 50 weight %, preferably 5 to 40 weight %, of the total resin. In other words, for smooth melt-molding under anhydrous conditions, there are limits to the degree of localization of the oxyalkylene moiety within the copolymer and the length of the oxyalkylene moiety. The range of n is 1 to 50, preferably 3 to 50 and that of the degree of saponification is preferably 80 to 100 mol %.

The oxyalkylene group-containing vinyl alcohol copolymer to be used in the present invention must have a melt index of not less than 5 g/10 min. under a load of 2160 g at 210° C. When this value is less than 5 g/10 min, melt-molding may not be performed as smoothly as desired even if other conditions are fulfilled. In this specification, the melt index is the value measured with a Toyo Seiki melt indexer with a 1 mm dia. x 10 mm nozzle.

Thus, the melt-molding under substantially plasticizer-free and substantially anhydrous conditions is feasible with success on a commercial scale only when the oxyalkylene group-containing vinyl alcohol copolymer meeting the above requirements is employed.

The above oxyalkylene group-containing vinyl alcohol copolymer can be produced by polymerizing monomers for constituting said vinyl ester unit (B) and oxyalkylene allyl ether unit (C), if necessary, together with other copolymerizable monomers, and then hydrolyzing the resulting polymer. By this hydrolysis procedure, most or all of vinyl ester unit (B) are converted to a vinyl alcohol unit.

The polymerization process that can be employed is generally solution polymerization but depending on cases, suspension polymerization and emulsion polymerization techniques may also be employed.

The hydrolysis can be carried out with alkali or acid.

Starch and Starch-Derived Macromolecules

As the starch and starch-derived macromolecules, there may be mentioned raw starches such as corn starch, potato starch, sweet potato starch, wheat starch, cassava starch, sago starch, tapioca starch, sorghum starch, rice starch, bean starch, arrowroot starch, bracken starch, lotus starch and water chestnut starch, physically modified starches (α-starch, fractionated amylose, moist heat-treated starch, etc.), enzymatically modified starches (hydrolyzate dextrin, dextrin produced by enzymatic degradation, amylose, etc.), chemical degradation-modified starches (acid-treated starch, hypochlorite-oxidized starch, dialdehyde starch, etc.), chemically modified starch derivatives (esterified starches, etherified starches, cationized starches, cross-linked starches, etc.) and so forth. Among the chemically modified starch derivatives, the esterified starches include, among others, starch acetate, starch succinate, starch nitrate, starch phosphate, starch urea phosphate, starch xanthate and starch acetoacetate, the etherified starches include, among others, allyl etherified starch, methyl etherified starch, carboxymethyl etherified starch, hydroxyethyletherified starch and hydroxypropyl etherified starch, the cationized starches include, among others, the reaction product from starch and 2-diethylaminoethyl chloride and the reaction product from starch and 2,3-epoxypropyltrimethylammonium chloride, and the crosslinked starches include, among others, formaldehyde-crosslinked starch, epichlorohydrin-crosslinked starch, phosphoric acid-crosslinked starch and acrolein-crosslinked starch.

Cellulosic macromolecules, other polysaccharide macromolecules and proteinic macromolecules may also be used in combination with the starch or a starch-derived macromolecule.

The cellulosic macromolecules include, among others, methylcellulose, ethylcellulose, hydroxyethylcellulose, hydroxypropylcellulose, hydoxyethylmethylcellulose, hydroxypropylmethylcellulose, hydoxybutylmethylcellulose, carboxymethylcellulose, acetylcellulose and nitrocellulose.

Other polysaccharide macromolecules include, among others, mannans, such as ivory nut mannan, salep mannan, wood mannan, kelp mannan and yeast mannan, fructans, such as inulin and levan, glycogen, charonin, laminaran, xylan, chitin, chitosan, pectinic acid, hyaluronic acid, agarose, alginic acid, heparin, chondrotin sulfate, carrageenan, gum arabic, gum tragacanth, gum karaya, gum guaiac, locust bean gum, mesquite gum, gum ghatti, funori (gloiopeltis glue) and agar.

The proteinic macromolecules include, among others, collagens, such as gelatin and glue, casein, sein, gluten, blood albumin and soya protein.

Proportions

The mixing ratio between the oxyalkylene group-containing vinyl alcohol copolymer and the starch or starch-derived macromolecule should be within the range of 90:10 to 10:90 by weight, preferably 80:20 to 30:70 by weight. When the starch or starch-derived macromolecule is used in a higher proportion, the moldability is impaired and at the same time the strength of the molded articles decreases. On the other, when said macromolecule is used in a smaller amount, the biodegradability becomes unsatisfactory.

Melt Molding

Prior to melt-molding, a plasticizer such as a polyhydric alcohol may be incorporated but since sufficient flexibility can be obtained without a plasticizer and the use of a plasticizer may rather adversely affect the properties of the product, it is rather recommended not to use a plasticizer. In melt molding, water may be incorporated. However, this requires a step of drying, hence it is recommended not to use water.

To sum up, in the practice of the invention, it is desirable to carry out melt-molding under substantially plasticizer-free and substantially anhydrous conditions (at a moisture content of not more than about several percent by weight, preferably not more than 1% by weight, more preferably not more than 0.5% by weight). It is one of the characteristic features of the invention that smooth melt-molding can be performed even under such conditions. In melt molding, various additives, such as fillers, colorants, stabilizers, antioxidants, ultraviolet absorbers, flame retardants and water resistance-imparting agents, and functional agents, such as fertilizers, agrochemicals, enzymes, biocides, deodorants and perfumes, as well as other water-soluble or water-insoluble resins can be incorporated in the molding compounds.

The melt-molding process may be any of injection molding, extrusion molding, transfer molding and other techniques.

Extrusion molding includes blow molding, inflation molding, coextrusion molding and extrusion coating as well. In extrusion molding, the die temperature is preferably set at 150° to 300° C. and the temperature of the screw compression zone is at a temperature higher by 5° to 30° C. than the temperature of the discharge zone.

The preferred injection molding conditions are: cylinder temperature 150° to 250° C., mold temperature 30° to 100° C. and injection pressure 500 to 2000 kg/cm$^2$. It is surprising that the polymer compositions having water solubility or hydrophilicity a used in the practice of the invention can be injection-molded under plasticizer-free and substantially anhydrous conditions.

By such melt-molding, moldings having any form and shape as desired can be obtained, for example fibrous moldings (fibers, monofilaments, etc.), and film-like moldings (films, sheets, tapes, tubes, bottles, trays, etc.).

The moldings obtained may be further subjected to secondary treatment or processing, such as weather resistance-imparting treatment, stretching or drawing, fiber splitting, or bag manufacture.

Effects

In accordance with present invention, the moldings, or shaped articles, are produced by melt-molding a composition comprising an oxyalkylene group-containing vinyl alcohol copolymer and starch or a starch-derived macromolecule and therefore show sufficient strength and other characteristics when they are used for their intended purposes whereas, after achievement of said purposes, they are rapidly degraded under the action of microorganisms in the soil and/or water.

Furthermore, said melt-molding can be performed under substantially plasticizer-free and substantially anhydrous conditions. This is a very advantageous feature of the invention from the commercial productivity viewpoint. The freedom from the use of any plasticizer means that neither plasticizer bleeding from the molding nor adhesion between the moldings occurs.

In particular, the use of a vinyl alcohol copolymer of the oxyalkylene allyl ether type mentioned above as the oxyalkylene group-containing vinyl alcohol copolymer is preferable. This is because, in the saponification reaction for the production of said copolymer, the oxyalkylene group in the oxyalkylene allyl ether unit (C) will not be eliminated and because, in said copolymer, the vinyl alcohol unit (A) and the oxyalkylene allyl ether unit (C) are distributed in an appropriate ratio and the weight proportion of the oxyalkylene unit in unit (C) is controlled within the specific range mentioned above, so that the degree of localization of the oxyalkylene unit and the length of the oxyalkylene unit are well balanced and well suited for melt-molding. Therefore, the compositions comprising this copolymer and starch or a starch-derived macromolecule can be smoothly molded in a commercially acceptable manner even under substantially plasticizer-free and substantially anhydrous conditions.

The resulting shaped article is not only water-soluble or water-dispersible and flexible but has an odor trapping property, oil resistance, chemical resistance, antistaticity, oxygen barrier property and warmth retention property, all of which are derived from the vinyl alcohol unit (A).

Fibrous moldings

As a particular case of the above-mentioned melt-molding, the production of fibrous shaped articles is described below in further detail.

Any melt-molding method suited for melt spinning may be employed, for example the extrusion molding method. The extruder is not limited to any particular type but conventional melt molding machines for thermoplastic resins can be used for fiber production, with a nozzle attached thereto. The nozzle may have any desired form unless inappropriate. In the practice of the invention, the fiber size or fineness is not critical but fine fibers of 1 to several deniers, medium-size fibers of 10 to tens of deniers and further relatively heavy filamentous fibers of hundreds of deniers can be produced.

The extruder is operated preferably at a temperature of 100° C. or above, more preferably within the temperature range of 120° to 180° C. At below 100° C., melt extrusion is substantially impossible.

More specifically, the discharge section temperature should preferably be adjusted to 105° to 150° C. and the screw compression section temperature to a temperature higher by 5° to 40° C. than the discharge section temperature. At temperatures higher than 200° C., starch is decomposed.

The barrel is heated by means of electricity, burning oil or steam, for instance. The cylinder is generally sectionalized into 3 to 5 sections, and heaters are set so that the temperature of each section can be controlled independently.

The thus-obtained fibers may be subjected to stretching, if necessary. Stretching is desirably carried out at a stretching temperature of 50° to 200° C., with a draw ratio of 3 to 10 times.

It is surprising that, as in the practice of the invention, a macromolecular composition having water solubility or hydrophilicity can be readily molded into fibers by melt spinning, especially without using a plasticizer in large amounts. Furthermore, the fibers obtained have very good water solubility and therefore are very advantageous from the commercial standpoint.

Laminates

In producing laminates using a film-like molding (hereinafter referred to as "blend layer") made of a mixture of the above-mentioned oxyalkylene group-containing vinyl alcohol copolymer and starch or a starch-derived macromolecule, the partner laminating layer should preferably be made of a thermoplastic resin.

As the thermoplastic resin to be used in forming said thermoplastic resin layer, there may be mentioned, among others, olefinic polymers, such as low-density polyethylene, medium-density polyethylene, high-density polyethylene, polypropylene, ethylene-propylene copolymer, ethylene-vinyl acetate copolymer, ethyleneacrylic ester copolymers, and ionomers, styrenic polymers, such as polystyrene, butadiene-styrene copolymer and acrylonitrile-styrene copolymer, polyacrylonitrile, polyvinylidene chloride, ethylene-vinyl alcohol copolymer, polyvinyl chloride, polycarbonates, polyesters, polyamides and polyurethanes. Among them, nonpolar resins, such as low-density polyethylene, medium-density polyethylene, high-density polyethylene, polypropylene and polystyrene, are preferred.

The proportion of the starch or starch-derived macromolecule should be 10 to 90% by weight, preferably 20 to 80% by weight. Outside said range, the balance is disturbed among melt-moldability, interlaminar adhesion, water resistance, biodegradability and so forth.

For incorporation of the starch or starch-derived macromolecule, a polyhydric alcohol, such as glycerol, ethylene glycol or polyethylene glycol, may be added thereto as a dispersant. The level of addition of such dispersant is preferably about 0 to 20 parts by weight per 100 parts by weight of starch or starch-derived macromolecule.

The starch or starch-derived macromolecule should advantageously be so fine that the particle form can hardly be perceived in the blend layer. When the particle form is perceivable, the average aggregate size should preferably be not more than 5 $\mu$m. When said size is greater than 5 $\mu$m, the layer obtained may show decreases in interlaminar adhesion, water resistance, mechanical properties and other characteristics.

Other additives, such as plasticizers, colorants, stabilizers and lubricants, may be incorporated in the blend layer and/or thermoplastic resin layer.

The laminates are made of at least the blend layer and the thermoplastic resin layer. An adhesive resin layer may be provided between said layers. Examples of the adhesive resin in said adhesive resin layer include, among others, polyethylene, ethylene-vinyl acetate copolymer, ethylene-acrylic ester copolymers, ethylene-acrylic acid copolymer, ethylene-propylene copolymer, polypropylene, ionomers, and unsaturated carboxylic acid-modified polyolefins resulting from graft polymerization of an unsaturated carboxylic acid, such as maleic anhydride, on such polyolefins as those just mentioned above.

The lamination of the blend layer and thermoplastic resin layer or of these layers and the adhesive resin layer can be carried out by dry lamination, coating of one layer with the other layer, extrusion coating of one layer with the other layer, and simultaneous coextrusion molding of the layers, for instance.

The laminates of this invention can have any desired shape or form, for example a film or sheet, bottle, or tube form.

The laminates of the invention which have the above constitution are useful as packaging materials for foods (inclusive of drinks and seasonings) or drugs and also as packaging materials for products for which the packaging materials are required to have an oxygen barrier property and/or odor retaining property, for Example industrial materials, fertilizers and perfumes. They can be used not only as packaging materials but also as films for agricultural use, and other fields.

In the laminated moldings of this invention, such characteristic properties as oxygen barrier property, flexibility and odor retaining property, that the blend layer-constituting resin, namely the oxyalkylene group-containing vinyl alcohol copolymer have, are well utilized and, at the same time, such properties as strength and water resistance, that the thermoplastic resin layer-constituting thermoplastic resin have, are well utilized.

Furthermore, since starch or a starch-derived macromolecule is dispersed in the blend layer, the interlaminar adhesion between both the layers united together either directly or by the intermediary of an adhesive layer is improved. The starch or starch-derived macromolecule incorporated gives degradability to the laminated moldings. Thus, even when the laminated moldings are discarded after their use via routes other than regular ones, they can undergo spontaneous degradation.

Containers for Filthy Waste Matter

The containers for filthy waste matter comprise at least the blend layer and thermoplastic resin layer mentioned above.

The containers may further comprise another macromolecular film layer and/or an entangled fibrous layer (nonwoven fabric, woven fabric, knitted fabric, paper, net-like structure, etc.) unless their disposability into flush toilet and degradability should be impaired.

A particularly preferred layer constitution in said containers comprises the blend layer as the container outside or middle layer, the thermoplastic resin layer as the middle or inside layer, and a nonwoven fabric as the outermost layer.

In cases where the blend layer has water resistance as a result of heat treatment, the inside or middle layer may be said blend layer and the middle or outside layer may be the thermoplastic resin layer.

The multilayer packaging material can be produced, for example by lamination of films, coating of a layer with another layer, extrusion coating of a layer with another layer, and coextrusion of layers.

Said containers for filthy waste matter generally have a bag-like shape. As desired, however, they may also have a bottle-like, tray-like, box-like or tube-like shape, for instance.

The containers for filthy matter which has the above-mentioned constitution in accordance with the invention are particularly useful as bags for collecting filthy matter extruded through an artificial anus. Furthermore, they can be used as containers for receiving various kinds of filthy matter as well as human or animal excrement.

In the containers for filthy waste matter that are provided by the invention, the oxyalkylene group-containing vinyl alcohol copolymer is used as the blend layer-constituting resin, and starch or a starch-derived macromolecule is dispersed in said blend layer. Therefore, the characteristic properties that the oxyalkylene group-containing vinyl alcohol copolymer free of any natural macromolecule, for example flexibility and disposability in flush toilet, are retained in said containers and, at the same time, the odor-retaining property can be further improved. The containers are further provided with biodegradability or degradability after disposal. It is further possible to make the thermoplastic resin layer degradable after throwing into a flush toilet by incorporating starch or a starch-derived macromolecule in the thermoplastic resin layer as well.

Thus, the containers can function quite satisfactory in their intended use while their degradation can be secured after disposal in a flush toilet.

Particularly when the container outside o middle layer is the blend layer, the middle or inside layer is the thermoplastic resin layer and the outermost layer is a nonwoven fabric, the filthy matter collected and the odor thereof are prevented from leaking and the container as a whole is flexible and will not produce sound and therefore never allows others to become aware of the fact that it is being worn. Such a container is disposable in flush toilet and has a favorable feel and touch because of the nonwoven fabric side coming into contact with the skin. Said container thus shows optimal performance characteristics as a bag for collecting filthy matter discharged from the artificial anus and therefore persons with an artificial anus can wear it without worrying about wearing it. Furthermore, the problem of possible environmental pollution after disposal can be solved.

EXAMPLE

The following examples are further illustrative of the present invention.

OXYALKYLENE GROUP-CONTAINING VINYL ALCOHOL COPOLYMER

Polymer (X) Production Example 1

A polyoxyethylene (average: 25 mols) monoallyl ether and vinyl acetate were copolymerized in methanol in the presence of azobisisobutyronitrile and after stripping of the residual monomers, the reaction product was hydrolyzed by addition of a methanolic solution of sodium hydroxide. The hydrolyzed slurry was filtered to separate the copolymer, which was then washed and dried to give the desired oxyalkylene group-containing vinyl alcohol copolymer (X-1).

The proportion a of vinyl alcohol unit (A) in this copolymer (X-1) was 93 mol %. The proportion b of vinyl acetate unit (B) was 6 mol % and the proportion c of oxyethylene allyl ether unit was 1 mol %.

Thus, $$a + b + c = 100 \text{ mol \%}$$
$$c = 1 \text{ mol \%}$$
$$100a/(a + b) = 94$$

Based on the total weight of (A), (B) and (C), the proportion of the oxyethylene moiety was 19 weight %.

The melt index of this copolymer (X-1) under a load of 2160 g at 210° C. was 25 g/10 min.

The viscosity of a 4 wt. % solution of the copolymer (X-1) was 4.0 cps/20° C.

Polymer (X) Production Examples 2 to 6

Polymers (X-2), (X-3), (X-4), (X-5) and (X-6), which have the characteristic values shown in Table 1, were produced following the procedure used for the production of the above-mentioned polymer (X-1).

TABLE 1

|  | Polymer (X) Production Example | | | | | |
|---|---|---|---|---|---|---|
|  | 1 | 2 | 3 | 4 | 5 | 6 |
| Unit (A) a mol % | 93 | 97.4 | 97.8 | 93.2 | 66 | 92 |
| Unit (B) b mol % | 6 | 1.0 | 1.0 | 2.8 | 22 | 4.9 |
| Unit (C) c mol % | 1 | 1.6 | 1.2 | 4 | 12 | 1.1 |
| Unit (D) d mol % | 0 | 0 | 0 | 0 | 0 | 2 |
| n in unit (C) | 25 | 25 | 15 | 10 | 2 | 15 |
| a + b + c mol % | 100 | 100 | 100 | 100 | 100 | 98 |
| 100 a/(a + b) mol % | 94 | 99 | 99 | 97 | 75 | 95 |
| Wt. % of oxyalkylene moiety | 19 | 30 | 15 | 34 | 16 | 23.9 |
| Melt index (g/10 min.) | 25 | 18 | 21 | 9 | 37 | 13 |
| Viscosity of 4 wt. % solution in water | 4.0 | 2.9 | 4.3 | 3.8 | 3.5 | 3.9 |

Note 1 In all examples, unit (B) is vinyl acetate.
Note 2 Unit (C) is polyoxyethylene allyl ether in Examples 1~5 and polyoxypropylene allyl ether in Example 6. The terminus is H except that it is $CH_3$ in Example 5.
Note 3 Unit (D) is monomethyl maleate.
Note 4 Wt. % of oxyalkylene moiety is based on the total weight of (A) + (B) + (C).

[Starch or starch-derived macromolecle (Y)]
The following macromolecules were used:

| (Y-1): | Corn starch |
|---|---|
| (Y-2): | Oxidized starch |
| (Y-3): | Tapioca starch |

Production of biodegradable moldings

EXAMPLES 1 TO 7

The above-mentioned oxyalkylene group-containing vinyl alcohol copolymer (X) in powder form was dried to by weight or less.

The above polymer (X) and the above starch or starch-derived macromolecule (Y) were mixed up in the proportions shown in Table 2 in a Henschel mixer, and the mixture was fed to a twin-screw extruder and extruded linearly at 200° C., followed by pelletizing.

The pellets were then fed to a single-screw extruder and extruded through a T die to give a 10-μm-thick film. The cylinder temperature was 200° C., and the die temperature was 180° C.

Comparative Example 1

Using polyvinyl alcohol (Z-1) having a saponification degree of 99 mol % and a melt index of 8 g/10 min. in lieu of the oxyethylene group-containing vinyl alcohol copolymer (X), molding was performed in the same manner as in the above examples.

Comparative Example 2

Using polyvinyl alcohol (Z-2) having a saponification degree of 88 mol % and a melt index of 10 g/10 min. in lieu of the oxyethylene group-containing vinyl alcohol copolymer (X), molding was performed in the same manner as in the above examples.

Comparative Example 3

Using low-density polyethylene (Mitsubishi Kasei Corporation's F-161) (Z-3) having a melt index of 6 g/10 min. in lieu of the oxyethylene group-containing vinyl alcohol copolymer (X), molding was performed in the same manner as in the above examples.

CONDITIONS AND RESULTS

The conditions used and the results obtained are shown in Table 2. The properties shown were determined or evaluated as follows:

Walter Solubility

The test specimen (10 mm×50 mm×1 mm) was immersed in 100 g of water at 5° C. without stirring for 10 minutes. Then the state of dissolution was observed and evaluated according to the following criteria. The water after testing was also observed for turbidity.

- o : The dissolution residue amounts to less than 30% by weight.
- Δ: The dissolution residue amounts to 30% by weight or more but less than 70% by weight.
- x : The dissolution residue amounts to 70% by weight or more.

Biodegradability (Degradation Test)

The degradation test was performed using a Suga Shikenki sunshine weather meter at 50° C. The cycle comprising 12 minutes of spraying with water and 48 minutes of light irradiation was repeated 110 times.

With regards to the strength after testing, the specimen was conditioned to 20° C. and 65% RH and tested for break strength on an autograph. The rate of pulling was 40 mm/min. and the test specimen length was 20 mm.

The film appearance was evaluated according to the following criteria:
- A : The film has macroscopically disintegrated.
- B : The film shape remains but the film readily disintegrates.
- C : The film retains its shape and will not disintegrate.

Possible Decomposition of Starch or Starch-Derived Macromolecule (Y) During Molding The following criteria were used:
- o : No decomposition
- x : Decomposition

Strength and Modulus of Elasticity (1% Modulus)

The test specimen was conditioned to 20° C. and 65% RH and then tested for break strength on an autograph. The rate of pulling was 40 mm/min., and the specimen length was 20 mm and the specimen width 5 mm.

Bleeding

Each molding was maintained alternately in an atmosphere 20° C., 65% RH, 16 hours) and another atmosphere (40° C., 80% RH, 8 hours) each 30 times. Then the surface of the molding was observed and evaluated according to the following criteria.
- o : No bleeding observed.
- Δ: Bleeding observed to a slight extent.
- x : Bleeding evidently observed.

TABLE 2

| | Species of (X) and species of (Y) and mixing ratio by weight | Water solubility | Biodegradability | | Decomposition of (Y) | Strength kg/cm² | Elastic modules kg/cm² | Bleeding |
|---|---|---|---|---|---|---|---|---|
| | | | Appearance | Strength after testing | | | | |
| Example 1 | X-1/Y-1 70/30 | o | Already degraded | Already degraded | o | 90 | 35 | o |
| Example 2 | X-1/Y-2 70/30 | o | Already degraded | Already degraded | o | 70 | 30 | o |
| Example 3 | X-2/Y-1 70/30 | o | Already degraded | Already degraded | o | 60 | 27 | o |
| Example 4 | X-3/Y-1 65/35 | o | Already degraded | Already degraded | o | 65 | 29 | o |
| Example 5 | X-4/Y-1 65/35 | o | Already degraded | Already degraded | o | 55 | 23 | o |
| Example 6 | X-5/Y-1 60/40 | o | Already degraded | Already degraded | o | 60 | 25 | o |
| Example 7 | X-6/Y-1 50/50 | o | Already degraded | Already degraded | o | 51 | 20 | o |
| Comparative Example 1 | Z-1/Y-1 70/30 | — | — | — | — | — | — | — |
| Comparative Example 2 | Z-2/Y-1 60/40 | Δ | A-B | 20 | x | 120 | 40 | o |
| Comparative | Z-3/Y-1 | x | C | 70 | x | 80 | 31 | o |

TABLE 2-continued

| Species of (X) and species of (Y) and mixing ratio by weight | Water solubility | Biodegradability | | Decomposition of (Y) | Strength kg/cm² | Elastic modules kg/cm² | Bleeding |
|---|---|---|---|---|---|---|---|
| | | Appearance | Strength after testing | | | | |
| Example 3 | 70/30 | | | | | | |

Note 1 In Comparative Example 1, the mixture was unmoldable.
Note 2 Z-1 and Z-2 are each polyvinyl alcohol. Z-3 is low-density polyethylene.

From the results shown above, it is evident that, in the examples illustrative of the invention melt-molding could be conducted smoothly and the moldings had excellent biodegradability, mechanical characteristics and water solubility.

WATER-SOLUBILITY FIBERS

Examples 8 to 12

TABLE 3

| | | X | | Viscosity | Degree of saponification | Melt index | X/Y | Draw ratio |
|---|---|---|---|---|---|---|---|---|
| | (A) % | (B) % | (C) % | (cps) | (mol %) | (g/10 min) | weight ratio | (times) |
| Example 8 | 93 | 6 | 1 | 3.6 | 94 | 8 | 80/20 | 5 |
| 9 | 97.4 | 1.0 | 1.6 | 2.9 | 99 | 10 | 80/20 | 5 |
| 10 | 93.2 | 2.8 | 4 | 3.8 | 97 | 15 | 60/40 | 5 |
| 11 | 66 | 22 | 12 | 3.5 | 75 | 25 | 60/40 | 5 |
| 12 | 92 | 4.9 | 1.1 | 3.9 | 95 | 15 | 50/50 | 5 |
| Comparative 4 | Polyvinyl alcohol | | | 3.8 | 99 | 8 | / | 5 |
| tive 5 | Polyvinyl alcohol | | | 5.0 | 88 | 2 | / | 6.5 |
| Example 6 | Polyvinyl alcohol | | | 5.0 | 88 | 8 | 60/40 | 5 |
| 7 | Same as in Example 8 | | | 3.6 | 94 | 8 | / | 5 |

Note 1 X = Oxyalkylene group-containing vinyl alcohol-based polymer; Y = Starch or starch-derived macromolecule
Note 2 (A): Vinyl alcohol unit (B): Vinyl acetate unit (C): In Examples 8 and 9, oxyethylene allyl ether unit (n = 9); In Examples 10 and 11, oxyethylene allyl ether unit (n = 15); In Example 12, oxyethylene allyl ether unit (n = 9).
Note 3 Viscosity: of 4 wt % aqueous solution at 20° C.

The oxyalkylene group-containing vinyl alcohol copolymers shown in Table 3 were respectively blended with corn starch as a typical example of the starch or starch-derived macromolecule in a Henschel mixer, and the mixture was melted at about 150° C. on a screw extruder and extruded through a nozzle having a pore diameter of 0.5 mm at a discharge rate of 5 g/min./nozzle. The filament was wound up at a rate of 400 m/min. Then the filament was hot-stretched 5 times at 120° C. by the conventional method to give a 1-denier fiber.

Comparative Examples 4 and 5

Using the polyvinyl alcohol species shown in Table 1 in lieu of the oxyalkylene group-containing vinyl alcohol copolymer but without using any starch or starch-derived macromolecule, fibers were produced by the dry spinning method.

Comparative Example 6

Using a composition composed of polyvinyl alcohol and corn starch as a typical example of the starch or starch-derived macromolecule), a fiber was produced by the dry spinning method.

Comparative Example 7

A fiber was produced by the melt-spinning method as in Example 8 except that no starch or starch-derived macromolecule was used.

Some typical properties of the fibers obtained as mentioned above are shown in Table 4. The properties were measured or evaluated as follows:

Water solubility:
(1) One gram of fiber was immersed in 100 g of water at 95° C. for 1 minute without stirring. Thereafter the dissolution state was observed and the dissolution residue was measured.

(2) One gram of fiber was immersed in 100 g of water at 60° C. for 2 minutes without stirring. There after the dissolution state was observed and the dissolution residue was determined.

Strength: The measurement was performed according to JIS L-1090.

TABLE 4

| | Water solubility (wt %) (1) | Water solubility (wt %) (2) | Strength (g/d) |
|---|---|---|---|
| Example 8 | 0 | 2 | 1.5 |
| 9 | 0 | 2 | 1.5 |
| 10 | 0 | 4 | 1.2 |
| 11 | 0 | 4 | 1.2 |
| 12 | 0 | 6 | 1.1 |
| Comparative 4 | 45 | 90 | 1.8 |
| tive 5 | 25 | 60 | 1.1 |
| Example 6 | 15 | 30 | 1.0 |
| 7 | 5 | 10 | 1.6 |

Laminates

Example 13

Resin Composition for Blend Layer Formation

Polyoxyethylene monoallyl ether number of moles of oxyethylene added=about 25) and vinyl acetate were copolymerized in methanol in the presence of azobisisobutyronitrile and then the resultant copolymer was saponified by the conventional method.

Thus was obtained an oxyethylene group-containing vinyl alcohol copolymer having a saponification degree of 93 mol % as to the vinyl acetate units, an oxyethylene monoallyl ether content of 1 mol % and a polyoxyethylene content of 19% by weight. This copolymer showed a melt index of 25 g/10 min. as determined at a temperature of 210° C. and under a load of 2160 g.

This oxyalkylene group-containing vinyl acetate copolymer in powder form was dried to a moisture content of not more than 0.1% by weight, then fed to an extruder and extruded linearly for pelletizing.

The pellets (45 parts), 55 parts of corn starch powder and 10 parts of glycerol were mixed up in a Henschel mixer and the mixture was fed to a twin-screw extruder and extruded linearly for pelletizing.

Resin for Thermoplastic Resin Layer Formation

Low-density polyethylene in pellet form with a melt index of 6 g/10 min. as determined at a temperature of 190° C. and under a load of 2160 g was used.

Resin for Adhesive Resin Layer Formation

An unsaturated carboxylic acid-modified polyethylene (Mitsui Petrochemical Industries' Admer VF-500) in pellet form with a melt index of 2 g/10 min. as determined at a temperature of 190° C. and under a load of 2160 g was used.

Production of Laminated Moldings

The above-mentioned pellets for respective layer formation were fed to a three-layer T die cast film producing machine, and extrusion molding was carried out at a die temperature of 190° C. while the cylinder temperature was controlled at 210° C. for the inside layer-constituting blend layer, at 190° C. for the middle layer-constituting adhesive resin layer, and at 190° C. for the outside layer-constituting thermoplastic resin layer. Thus was obtained a coextruded three-layer film having the following construction:

| Inside layer | Blend layer | 30 μm |
| Middle layer | Adhesive resin layer | 15 μm |
| Outside layer | Thermoplastic resin layer | 40 μm |

The blend layer of the three-layer film obtained had good degradability as shown in Table 5, and the interlaminar adhesion was good.

Example 14

The procedure of Example 13 was followed using pellets prepared from a mixture composed of 45 parts of the oxyethylene group-containing vinyl alcohol copolymer of Example 13, 55 parts of oxidized starch powder and 10 parts of glycerol as the resin composition for blend layer formation, to give a coextruded three-layer film. The results obtained are shown in Table 5.

Example 15

The procedure of Example 13 was followed using pellets prepared from a mixture of 45 parts of the oxyethylene group-containing vinyl alcohol copolymer, 55 parts of urea-phosphorylated starch powder and 10 parts of polyethylene glycol as the resin composition for blend layer formation, to give a coextruded three-layer film. The results are shown in Table 5.

Comparative Example 8

The procedure of Example 13 was followed using pellets prepared from a mixture of 100 parts of the oxyethylene group-containing vinyl alcohol copolymer and 10 parts of glycerol as the resin for blend layer formation, to give a coextruded three-layer film. The results are shown in Table 5.

Example 16

The procedure of Example 13 was followed using pellets prepared from a mixture of 45 parts of low-density polyethylene having a melt index of 6 g/10 min. as determined at a temperature of 190° C. and under a load of 2160 g, 55 parts of corn starch and 10 parts of glycerol as the resin composition for thermoplastic resin layer formation, to give a coextruded three-layer film. The results are shown in Table 5.

Example 17

The procedure of Example 16 was followed except that the adhesive resin layer was omitted, whereby a coextruded two-layer film was obtained. The results are shown in Table 5.

Film after degradation test: The test specimen subjected to 110 cycles of exposure at 50° C. to water spray (12 minutes) and light (48 minutes) using a sunshine weather meter (Suga Shikenki) was used.

Dry strength: The test specimen, 20 mm in length, was conditioned to 20° C. and 65% RH and then stretched on an autograph at a pulling rate of 40 mm/min. and the strength at break of the specimen was measured.

Peel strength: The test specimen, 20 mm in length, was conditioned to 20° C. and 65% RH and then tested for peel strength on an autograph at a pulling rate of 40 mm/min.

Film appearance: The following criteria were used.
A : The film has macroscopically disintegrated.
B : The film shape remains but the film readily disintegrates.
C : The film will not disintegrate.

TABLE 5

| | Degradation test | | | Peel strength (g/ 25 mm) |
| --- | --- | --- | --- | --- |
| | Dry strength $(kg/cm^2)$ | Film after degradation test | | |
| | | Appearance | Dry strength $(kg/cm^2)$ | |
| Example 13 | 180 | A–B | 0 | 1200 |
| Example 14 | 230 | A–B | 0 | 1500 |
| Example 15 | 250 | A–B | 0 | 1500 |
| Example 16 | 170 | A | 0 | 900 |
| Example 17 | 140 | A | 0 | 800 |
| Comparative Example 8 | 350 | C | 80 | 2000 |

Example 18

Oxyalkylene group-containing vinyl alcohol copolymer pellets were prepared under the same conditions as used in Example 13.

Fifty parts by weight of the pellets and 50 parts by weight of corn starch powder were mixed up in a Henschel mixer, and the mixture was extruded linearly and pelletized using a twin-screw extruder at a cylinder temperature of 180° C. and a die temperature of 160° C., to give pellets P.

Separately, 50 parts by weight of low-density polyethylene having a melt index of 6 g/10 min. as determined at a temperature of 190° C. and under a load of 2160 g and 50 parts by weight of corn starch were blended in a Henschel mixer and the mixture was extruded linearly and pelletized using a twin-screw extruder at a cylinder temperature of 150° C. and a die temperature of 140° C., to give pellets E.

The above pellets P and pellets E were fed to a two-layer inflation extruder, melted and kneaded at a cylinder temperature of 160°–180° C. for pellets P and a cylinder temperature of 130°–170° C. for pellets E, and the molten resin layers were joined together at a die temperature of 160° C. to give a laminated film.

The corn starch-containing oxyalkylene group-containing vinyl alcohol copolymer layer on the outside had a thickness of 50 μm and the corn starch-containing low-density polyethylene resin layer on the inside had a thickness of 50 μm.

A nonwoven fabric with a basis weight of 20 g/m² was further laminated to the above laminated film on the outside thereof. Bags were manufactured from the resultant composite material and their performance characteristics were evaluated.

Example 19

The pellets P prepared in Example 18 were fed to an extruder equipped with a T die and extruded at a cylinder temperature of 180° C. and a die temperature of 160° C. to give a corn starch-containing oxyalkylene group-containing vinyl alcohol copolymer film layer with a thickness of 50 μm.

Separately, the pellets E prepared in Example 18 were fed to an extruder equipped with a T die and extruded at a cylinder temperature of 180° C. and a die temperature of 160° C. to give a corn starch-containing low-density polyethylene resin layer with a thickness of 50 μm.

An adhesive resin layer consisting of a maleic anhydride graft-modified ethylene-vinyl acetate copolymer was laminated, by extrusion coating, onto the corn starch-containing oxyalkylene group-containing vinyl alcohol copolymer film layer obtained as mentioned above while the corn starch-containing low density polyethylene resin layer was further laminated onto said adhesive resin layer under pressure. Thus a three-layer film was obtained. The adhesive resin layer had a thickness of 10 μm.

A nonwoven fabric with a basis weight of 20 g/m² was joined to said three-layer film on the corn starch-containing oxyalkylene group-containing vinyl alcohol copolymer film layer side. Bags were manufactured from the resultant composite material and their performance characteristics were evaluated.

Comparative Example 9

An ostomy bag obtained in the market had the following construction: (inside) 50-μm-thick ethylenevinyl acetate copolymer layer/30-μm-thick polyvinylidene chloride layer/30-μm-thick ethylene-vinyl acetate copolymer layer/nonwoven fabric with basis weight 20 g/m² (outside). This bag was evaluated for performance characteristics.

Comparative Example 10

Another ostomy bag for comparison had the following construction: (inside) 50-μm-thick polyvinyl alcohol layer (polymerization degree 500, saponification degree 88 mol %)/30-μm-thick polyvinylidene chloride layer/30-μm-thick ethylene-vinyl acetate copolymer layer/nonwoven fabric with a basis weight of 20 g/m² (outside). This bag was evaluated for performance characteristics.

Comparative Example 11

Bags were manufactured following the procedure of Example 18 except that a 50-μm-thick, corn starch-free film layer of the oxyalkylene group-containing vinyl alcohol copolymer was used in lieu of the corn starch-containing oxyalkylene group-containing vinyl alcohol copolymer film layer and that a 50-μm-thick, corn starch-free low-density polyethylene resin layer was used in lieu of the corn starch-containing low-density polyethylene resin layer. The bags obtained were evaluated for performance characteristics.

The results obtained in the above-mentioned Examples 18 and 19 and Comparative Examples 9 to 11 are shown in Table 6.

The evaluation items and evaluation criteria were as follows:

(1) Odor barrier property (a: ammonia; b: trimethylamine; c: ethylmercaptan)
  ○: No odor is perceivable.
  □: Odor is perceivable slightly but there is no problem from the practical viewpoint.
  △: Odor is perceivable.
  X : Odor is too strong for the bags to be practicable.

(2) Flexibility and non-sound-producing property
  ○: Very soft and flexible and good in non-sound-producing property.
  △: Non-sound-producing but somewhat unsatisfactory in flexibility, or flexible but somewhat unsatisfactory in non-sound-producing property.
  X : Poor in flexibility and in non-sound-producing property.

(3) Disposability in flush toilet
  ⊚: No practical problem.
  o : Undisposable.

(4) Feel and touch
  o : Very good
  □: Good
  △: Fair
  X : Bad (5) Degradability
  ⊚: Very good
  o : Good
  △: Fair
  x : Poor

TABLE 6

| | | Example | | Comparative Example | | |
|---|---|---|---|---|---|---|
| | | 18 | 19 | 9 | 10 | 11 |
| Odor barrier | a | △ | △ | △ | △ | △ |
| property | b | o | o | o | △ | o |
| | c | o | o | △ | △ | △ |
| Flexibility and non-sound-producing property | | o | o | x | x | o |
| Disposability in flush toilet | | ⊚ | ⊚ | x | x | o |
| Feel and touch | | o | o | □ | □ | o |
| Degradability | | ⊚ | ⊚ | x | △ | △ |

We claim:

1. A melt-molded article produced by melt-molding a composition comprising an oxyalkylene group-containing vinyl alcohol copolymer and starch or a starch-derived macromolecular substance.

2. The melt molded article as claimed in claim 1, wherein the oxyalkylene unit content in said oxyalkylene group-containing vinyl alcohol copolymer is 3 to 40% by weight.

3. The melt molded article as claimed in claim 1, wherein the weight proportions of the oxyalkylene group-containing vinyl alcohol copolymer and the starch or starch-derived macromolecular substance are 90:10 to 10:0.

4. The melt molded article as claimed in claim 1, wherein the wherein the melt-molding is conducted under plasticizer-free and anhydrous conditions.

5. The melt molded article as claimed in claim 1, wherein said article is in the form of a fiber.

6. The melt molded article as claimed in claim 1, wherein said article is in the form of a film.

7. A laminate wherein at least one layer is the film of claim 6.

8. A container for filthy waster matter which is made of the laminate of claim 7.

* * * * *

UNITED STATES PATENT AND TRADEMARK OFFICE
CERTIFICATE OF CORRECTION

PATENT NO. : 5,158,810
DATED : October 27, 1992
INVENTOR(S) : Tsukasa OISHI et al.

It is certified that error appears in the above-identified patent and that said Letters Patent is hereby corrected as shown below:

On the cover page, Item [75], line 1, "Mokou" should read --Mukou--.

Signed and Sealed this

Ninth Day of November, 1993

Attest:

BRUCE LEHMAN

*Attesting Officer*  *Commissioner of Patents and Trademarks*